Sept. 14, 1926.
T. J. FINN
1,599,704
STAPLING MACHINE
Filed Nov. 5, 1921    3 Sheets-Sheet 1
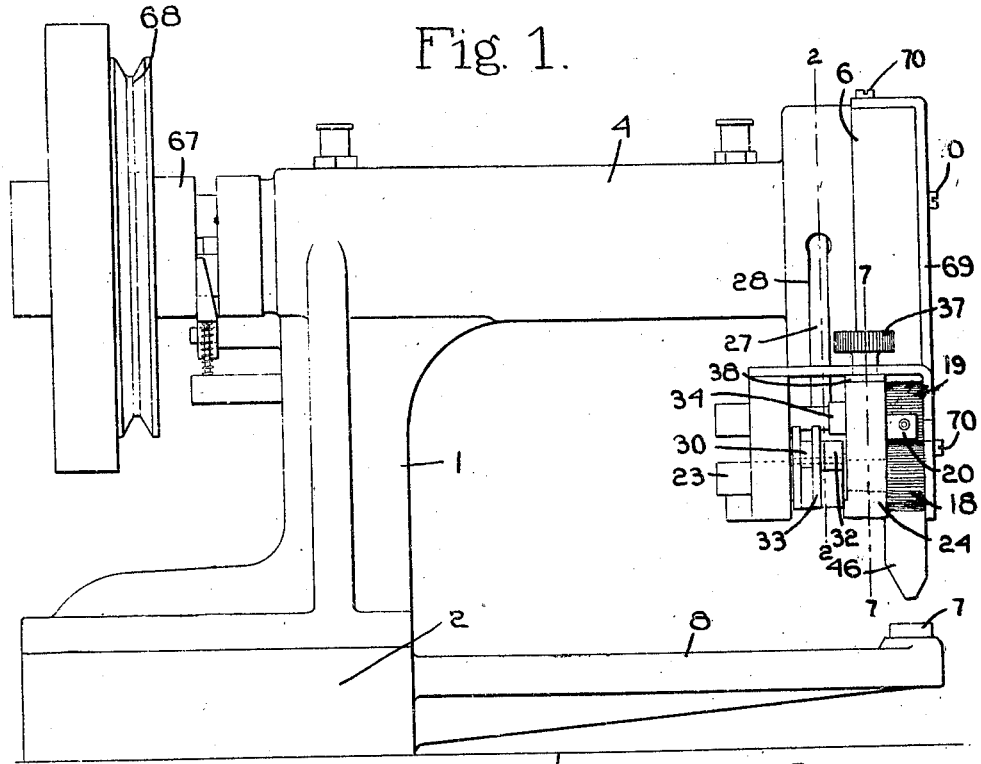
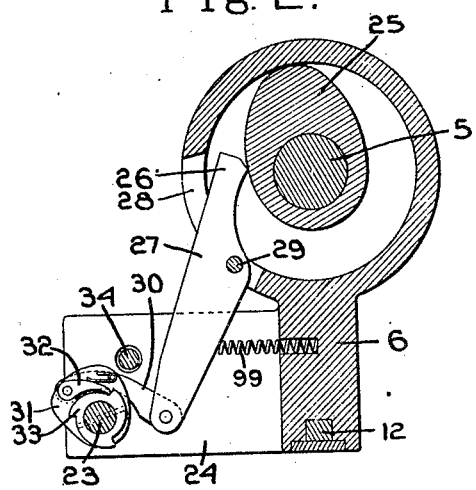
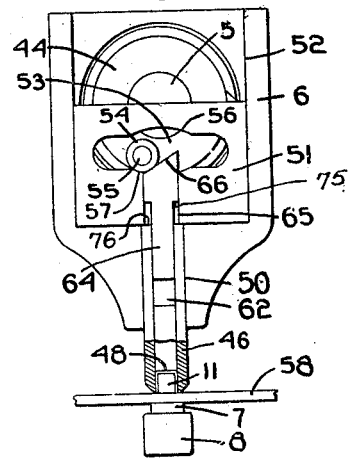
Inventor.
Thomas J. Finn
by Heard Smith & Tennant
Attys

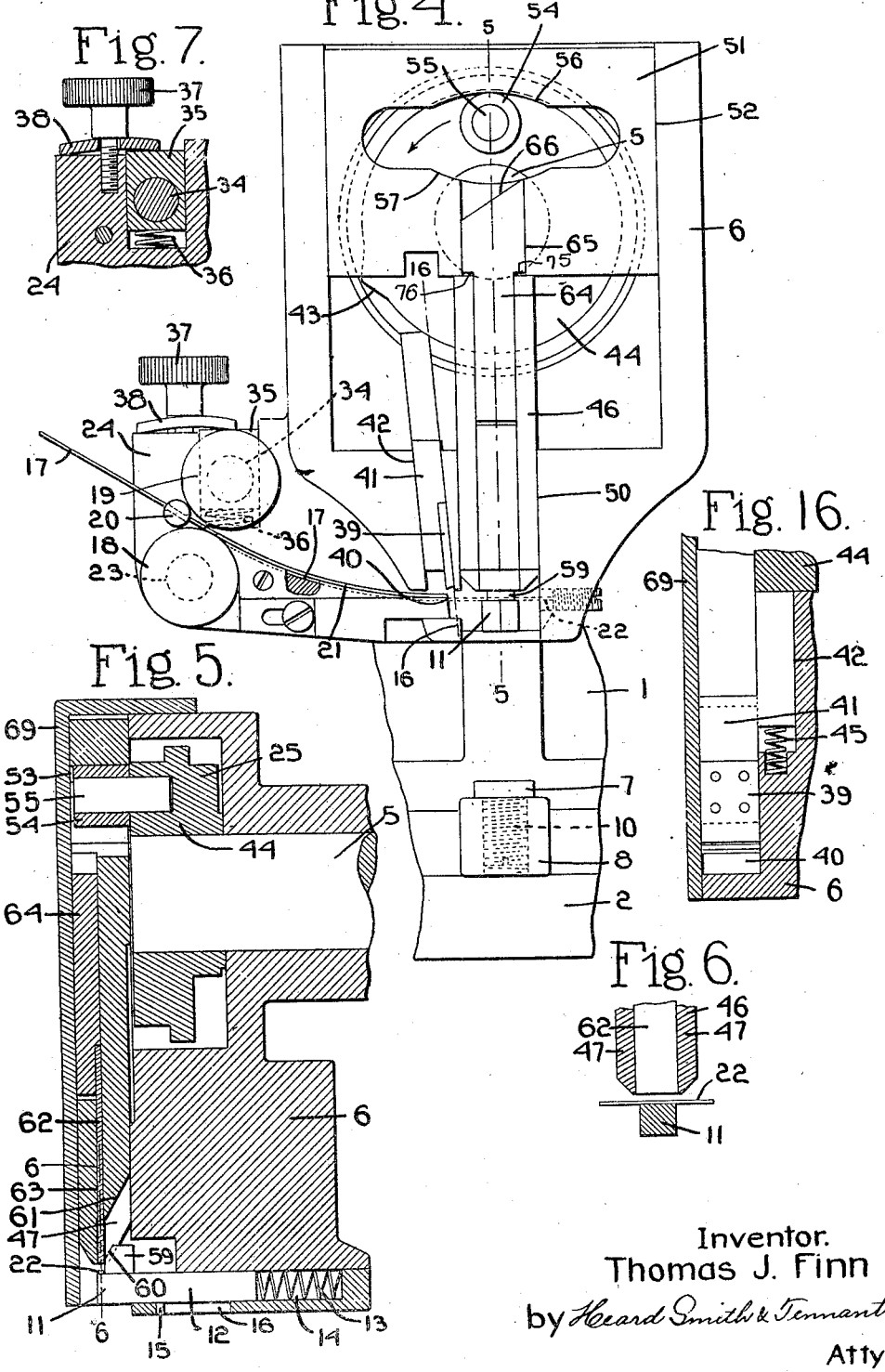

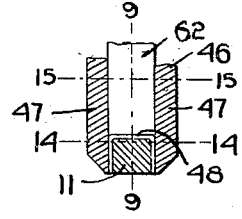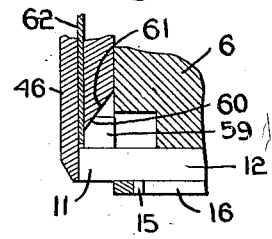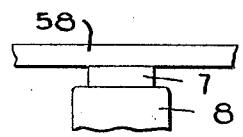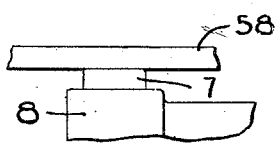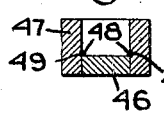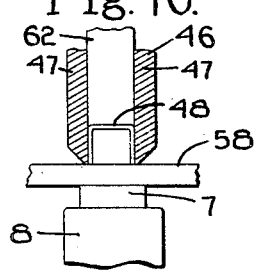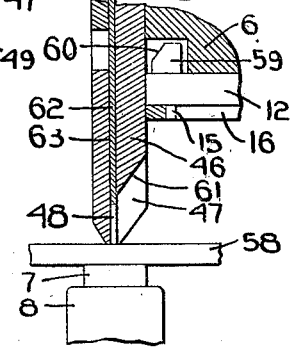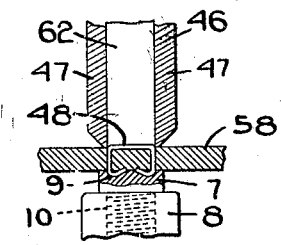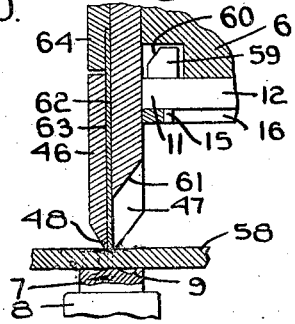

Patented Sept. 14, 1926.

1,599,704

UNITED STATES PATENT OFFICE.

THOMAS J. FINN, OF ALLSTON, MASSACHUSETTS.

STAPLING MACHINE.

Application filed November 5, 1921. Serial No. 513,054.

This invention relates to stapling machines and it has for some of its objects to provide a novel stapling machine which has relatively few parts and is correspondingly simple in construction; to provide a stapling machine in which the staple-forming member and the driver for driving the staple are both actuated in a novel way by the same actuator; to provide a stapling machine in which the operative parts are readily accessible so that they may be easily repaired or assembled; and otherwise to improve stapling machines all as will be more fully hereinafter set forth.

In order to give an understanding of the invention I have illustrated in the drawings a selected embodiment thereof which will now be described after which the novel features will be pointed out in the appended claims.

Fig. 1 of the drawings is a side view of a stapling machine embodying my invention.

Fig. 2 is a section on the line 2—2, Fig. 1.

Fig. 3 is a front view of the head with the cover plate removed showing the parts in position to drive the staple.

Fig. 4 is an enlarged view similar to Fig. 3 showing the staple-forming member and driver in their elevated position.

Fig. 5 is a section on the line 5—5, Fig. 4.

Fig. 6 is a section on the line 6—6, Fig. 5.

Fig. 7 is a section on the line 7—7, Fig. 1.

Fig. 8 is a view similar to Fig. 6 showing the parts in the position just after the staple is formed.

Fig. 9 is a sectional view on the line 9—9, Fig. 8.

Fig. 10 is a view similar to Fig. 8 showing the parts in the position when the staple has been carried to the work ready to be driven.

Fig. 11 is a corresponding view similar to Fig. 9.

Fig. 12 is a view similar to Fig. 8 showing the staple driven and clinched.

Fig. 13 is a corresponding view similar to Fig. 9.

Fig. 14 is a section on the line 14—14, Fig. 8.

Fig. 15 is a section on the line 15—15, Fig. 8.

Fig. 16 is a section on the line 16—16, Fig. 4.

The machine herein shown is constructed to be placed on a bench, although it will be obvious that the invention might be embodied in a machine which is sustained on a stand. In the construction herein shown the operative parts are carried by a frame 1 which has the base portion 2 that is secured to the bench 3 and also has the overhanging arm 4 in which the driving shaft 5 is journalled and which carries at its end a head 6 supporting the operative parts of the machine.

These operative parts comprise a staple-forming anvil over which the staple is formed, wire-feeding means to feed a length of wire to the staple-forming anvil, a cutting device to cut off a length of wire, a staple-forming member which co-operates with the staple-forming anvil to bend the severed length of wire into a staple, a driver for driving the staple into the work and a clinching anvil on which the work rests and which serves to clinch the points of the staple when it is driven.

The clinching anvil or work rest is shown at 7 and it is sustained on the end of an arm 8 which extends from the base 2. This clinching anvil 7 is formed with the hollowed or concave upper surface 9 to assist in bending the ends of the staple over as it is driven. The clinching anvil is preferably adjustably mounted in the arm 8 so that it can be adjusted as to height thereby accommodating work of different thicknesses and this may be provided for by providing the clinching anvil with a screw-threaded shank 10 which screw threads into the arm 8 so that by turning the clinching anvil one way or the other it will be adjusted vertically.

The staple-forming anvil over which the staple is formed is indicated at 11 and in the present embodiment of the invention it is rectangular in cross section so that the staple which is formed over it has square corners. This staple-forming anvil is provided with a stem 12 which is slidably mounted in a recess 14 formed in the head 6 and which is backed by a spring 13 that tends to hold it forwardly in its operative position. The staple-forming anvil is thus capable of being retracted, and in operation after a staple has been formed over it it will be forced backwardly into the recess 14 against the spring 13 thereby withdrawing it from the staple so that the staple may be driven. The stem 12 is shown as having a pin 15 depending therefrom which operates in a slot 16 formed in the head, said slot operating to limit the movement of the staple-forming anvil.

The wire from which the staple is made is indicated at 17 and it is fed to the anvil 11 by means of suitable wire-feeding devices, herein shown as two feed rolls 18 and 19. The wire passes through a guide 20 to the feed rolls 18, 19 and thence through another guide way 21 to the anvil 11, the construction being such that as the wire is fed forward the end portion 22 thereof will be carried across the top of the staple-forming anvil as indicated in dotted lines in Fig. 4 and in Figs. 5 and 6.

After the wire has been fed over the anvil 11 the end portion 22 is cut off and then it is bent around the said anvil 11 into the staple shape by means presently to be described.

As stated above the wire is fed into the machine by the feed rolls 18 and 19. The feed roll 18 is a positively driven roll and the feed roll 19 is in the form of a presser roll. The feed roll 18 is fast on a shaft 23 which is journalled in the portion 24 of the head and said shaft is intermittently rotated from the shaft 5 by a cam-actuated pawl and ratchet mechanism. The shaft 5 has thereon a feeding cam 25 which acts upon the upper end 26 of a lever 27 that extends through a slot 28 formed in the head and is pivoted thereto at 29. The lower end of the lever is pivoted to a link 30 which in turn is pivoted to a pawl carrier 31 that is loosely mounted on the shaft 23. A spring-pressed pawl 32 is pivotally mounted on the pawl carrier 31 and co-operates with a ratchet 33 fast on the shaft 23. The lever 27 is acted on by a return spring 99. At each rotation of the shaft 5 therefore the shaft 23 will be given a partial turn thus feeding the wire forward the required distance. The presser roll 19 is carried by a shaft 34 which is mounted in a block 35 that is vertically movable in the portion 24 of the frame. Said block is supported on a spring 36 and is held against the wire with an adjustable pressure by means of a thumb screw 37 which screws into the part 24 of the frame and acts on a bridge piece 38, one end of which bears on the block 35 and the other end of which bears on the frame.

After the wire has been fed over the anvil 11 the end 22 thereof is cut off, and this is herein accomplished by means of a cutter 39 which co-operates with a shearing edge 40 formed at the end of the guide 21. The cutter 39 is carried by a holder 41 which slides vertically in a groove or ways 42 formed in the head 6 and which is acted upon by a cam portion 43 of a cam member 44 that is fast on the shaft 5. At each rotation of the shaft, therefore, the cutter 39 is moved downwardly thereby to cut off the end 22 of the wire. The cutter is elevated by means of a suitable spring 45.

The length of wire 22 which is thus severed is formed into a staple over the anvil 11 by means of a staple-forming member 46, the latter being formed at its lower end with two wings 47 that pass down either side of the anvil 11 as the staple-forming member is moved vertically. The action of these wings 47 on the ends of the wire 22 is to bend the ends of the wire down against the sides of the anvil 11, as shown in Figs. 3 and 8, thus producing the staple 48. This staple-forming member is guided in a suitable groove or way 50 formed in the head 6 and is provided at its upper end with a cross head 51 which operates in ways 52 formed in the head 6. This cross head is provided with a slot 53 in which operates a roll 54 carried by a pin 55 secured to the cam member 44, said pin being eccentrically situated and thus acting as a crank pin. The upper wall of the slot 53 is curved upwardly at its center, as shown at 56, the curvature being on the arc of a circle corresponding to the path of movement of the outer wall of the roll 54. The lower wall of the slot 53 is curved downwardly at its central portion as shown at 57, the curvature of the portion 57 being the same as that of the portion 56.

With this arrangement as the disk 44 rotates the cross head 51 will be held stationary while the roll 54 is passing over the curved portion 56 of the slot and when the roll enters the end of the slot (assuming that the roll operates in the direction of the arrow in Fig. 4) then the roll will act to move the cross head 51 downwardly, and when the roll is passing over the curved wall 57 the cross head 51 will remain stationary again. Said cross head will be elevated as the roll is operating in the right hand end of the slot.

The movement which is given to the cross head, therefore, is an intermittent movement, said cross head having an appreciable dwell while the roll is passing over the top and bottom centers.

The wire is fed into position when the staple-forming member is elevated and the cutter 39 is actuated to cut the wire while the cross head is stationary at the upper end of its movement. After the wire is cut the downward movement of the staple-forming member 46 from the position shown in Figs. 4 and 5 into the position shown in Figs. 8 and 9 results in bending the ends of the wire about the anvil 11 thereby to form the staple 48.

After the staple has been thus formed, the staple-forming member is moved downwardly thereby carrying the staple down to the work 58 which rests against the work rest 7, and during this downward movement the anvil 11 is retracted to withdraw it from the path of movement of the staple. This step of the operation is shown in Figs. 10 and 11.

The retracting movement of the anvil 11 is secured by the downward movement of the staple-forming member and this is accomplished by forming the anvil 11 with the upstanding part 59 having a beveled face 60 and forming the staple-forming member 46 with the beveled face 61 which engages the face 60 as the staple-forming member moves downwardly thereby forcing the anvil 11 backwardly into the position shown in Fig. 11. This backward movement entirely withdraws the anvil 11 from the staple so as to permit it to be carried down against the work.

The staple is driven by means of a driver 62 which operates in a vertical slot 63 formed in the staple-forming member. This driver is connected to a slide 64 which operates in a groove 65 formed in the cross head 51 and is provided at its upper end with an inclined face 66 that is acted on by the roll 54 at the proper time to actuate the driver.

When the staple is being formed over the anvil 11 by the downward movement of the head 51, the driver 62 will remain stationary so that when the staple is fully formed the parts will be in the position shown in Fig. 3 with the inclined face 66 of the slide 64 situated above the curved wall 57 of the slot. When the parts have arrived at this relative position the staple has been carried down against the work 58 and the roll 54 has passed onto the curved wall 57 so that the cross head 51 will have no further downward movement. At this time the roll 54 engages the cam face 66 and as the roll passes over the low center it gives the slide 64 a quick downward movement thus giving the driver a movement relative to the staple-forming member and driving the staple through the work as shown in Figs. 12 and 13.

As the points of the staple pass through the work they engage the curved surface 9 of the anvil 7 and thus becomes clenched over as shown in Fig. 12.

After the staple has thus been driven then during the next one-half rotation of the shaft 5 the roll 54 will operate to raise the staple-forming member into the elevated position, shown in Fig. 4, and at this time the wire will be again fed forward to place another length thereof in position to be cut and formed into a staple. Both the downward and the upward movement of the head 51 results from the direct action of the roll 54 on the walls of the slot 53 so that said roll 54 acts directly to give the staple-forming member its movement in both directions. With regard to the driver, however, the roll 54 acts directly thereon to produce the downward movement only, such downward movement resulting from the engagement of the roll 54 with the cam face 66 as above described.

The upward movement of the driver is secured by means of the upward movement of the head 51. It will be noted that the driver is formed at its upper end with shoulders 75 and these shoulders are adapted to be engaged by co-operating shoulders 76 formed on the head 51 during the upward movement of the head. When the driver has completed its staple-driving movement the shoulders 75 will be brought close to the shoulder 76 and, therefore, when the head 57 begins to rise the engagement of the shoulders 76 with the shoulders 75 will raise the driver into the position shown in Fig. 4.

The machine will preferably be provided with a suitable clutch device 67 which will operate to automatically bring the parts to rest after each revolution. 68 designates a driving pulley by which the shaft is driven when the clutch is operating.

The head 6 is provided with a removable cover plate 69 which is held in position by suitable screws 70 and which operates to enclose the knife, the staple-forming member and the driver. This cover plate also acts as a means for retaining these parts in position, as will be clearly seen from Fig. 5.

The operative parts are made accessible by simply removing the cover plate 69.

I claim:

1. In a stapling machine, the combination with a staple-forming anvil, of means to feed wire to the said anvil, a staple-forming member adapted to bend a length of wire about the said anvil thereby to form a staple, a driver, a rotary actuating member adapted at each rotation to depress the staple-forming member thereby to form a staple and then to elevate said member and also adapted to give the driver its staple-driving movement, and means for elevating the driver by the elevating movement of the staple-forming member.

2. In a stapling machine, the combination with a staple-forming anvil, of means to feed wire to the said anvil, a staple-forming member adapted to bend a length of wire about the said anvil thereby to form a staple, said member having a shoulder, a driver, a rotary actuating member adapted at each rotation to depress the staple-forming member thereby to form a staple and then to elevate said member and also adapted to give the driver its staple-driving movement, said driver having a shoulder to co-operate with the shoulder of the staple-forming member, whereby the driver is elevated by the rising movement of the staple-forming member.

3. In a stapling machine, the combination with a staple-forming anvil, of means to feed wire to the said anvil, a staple-forming member co-operating with the said anvil to form a staple, said staple-forming member having a transverse slot, a driver slidably carried by the staple-forming member and having a cam face, a rotary actuating member having a crank pin operating in said slot and adapted to give the staple-forming member its staple-forming movement and its retracting movement, said crank pin acting against the cam face to give the driver its staple-driving movement, and means to retract the driver by the retracting movement of the staple-forming member.

4. In a stapling machine, the combination with a staple-forming anvil, of means to feed wire to the said anvil, a staple-forming member adapted to bend a length of wire about the said anvil thereby to form a staple, a driver, a rotary-actuating member adapted at each rotation to depress the staple-forming member thereby to form a staple and then to elevate said member, said actuating member acting directly on the driver during a portion only of its rotation, thereby to give the driver its staple-driving movement, and means for elevating the driver by the elevating movement of the staple-forming member.

5. In a stapling machine, the combination with a staple-forming anvil, of means to feed wire to the said anvil, a staple-forming member co-operating with the said anvil to form a staple, said staple-forming member having a transverse slot, a driver slidably carried by the staple-forming member and having a cam face, a rotary-actuating member having a crank pin operating in said slot, and adapted to give the staple-forming member both its staple-forming movement and its retracting movement, said crank pin acting as it passes its lower dead center against the cam face of the driver to give the latter its staple-driving movement, and means to retract the driver by the retracting movement of the staple-forming member.

6. In a stapling machine, the combination with a staple-forming anvil, of means to feed wire to the said anvil, a cutter to cut a length from said wire, a staple-forming member to bend said length about the said anvil thereby to form a staple, a driver for driving the staple, and a rotary actuating member adapted in its rotation to actuate first the cutter, then the staple-forming member and then the driver.

7. In a stapling machine, the combination with a staple-forming anvil, of means to feed wire to the said anvil, a cutter to cut a length from the wire, a staple-forming member to bend said length about the said anvil thereby to form a staple, a driver to drive the staple, and a rotary actuating member adapted in its rotation first to give the wire a feeding movement and then to actuate the cutter and subsequently to actuate the staple-forming member and the driver.

In testimony whereof, I have signed my name to this specification.

THOMAS J. FINN.